Oct. 11, 1927.
W. M. FULTON
1,644,775
PACKLESS VALVE
Filed March 31, 1922
2 Sheets-Sheet 1
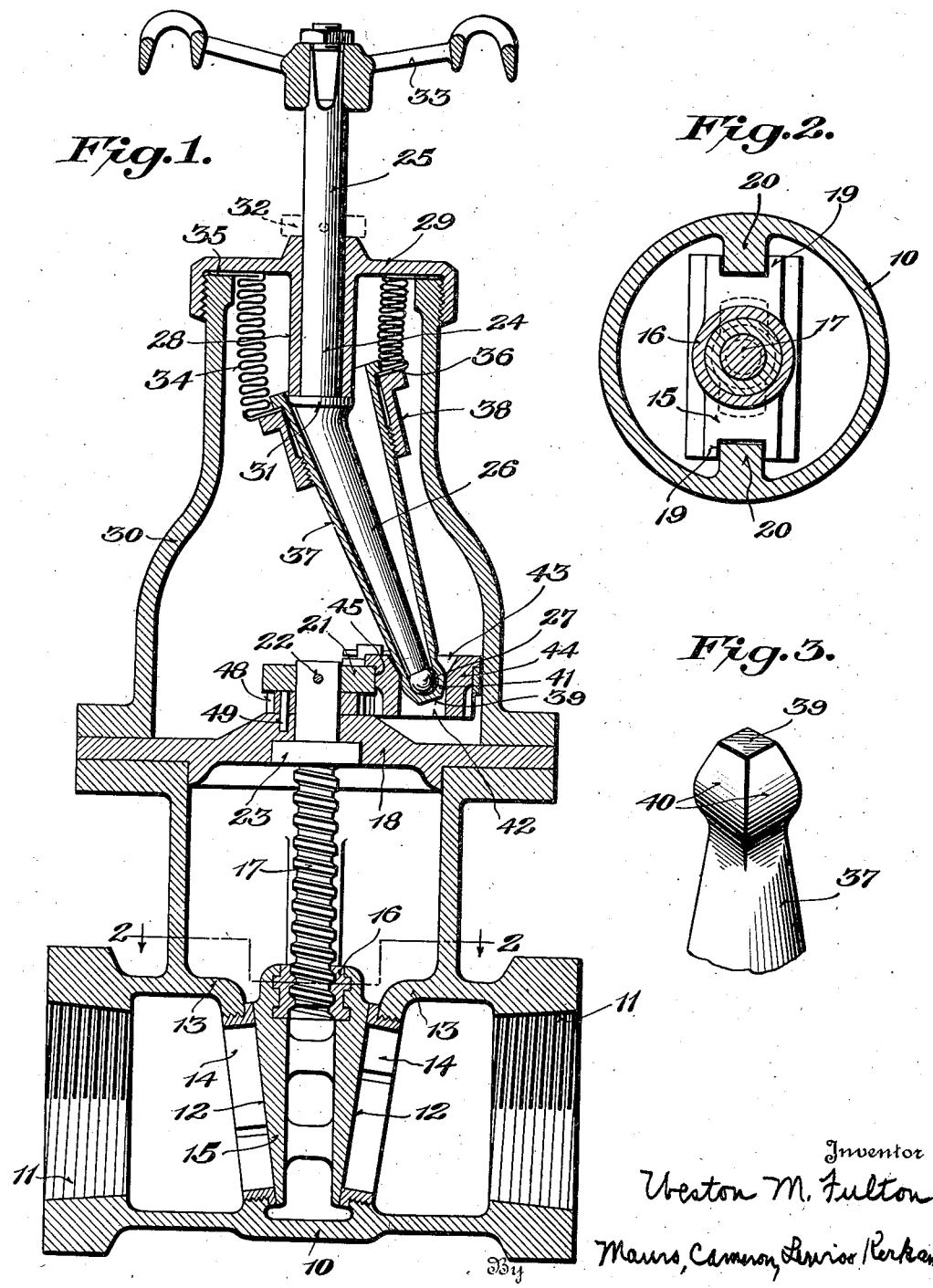

Oct. 11, 1927.

W. M. FULTON 1,644,775

PACKLESS VALVE

Filed March 31, 1922　　2 Sheets-Sheet 2

Inventor
Weston M. Fulton
By Mauro, Cameron, Lewis & Kerkam
Attorneys

Patented Oct. 11, 1927.

1,644,775

UNITED STATES PATENT OFFICE.

WESTON M. FULTON, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

PACKLESS VALVE.

Application filed March 31, 1922. Serial No. 548,404.

This invention relates to operating mechanism, and particularly to operating mechanism for valves which employ a flexible fluid-tight wall in place of packing to prevent leakage between the valve operating mechanism and its housing, and which are generally denominated "packless valves", although applicable to the operating mechanism of other devices employing a flexible partition wall.

In my application Sr. No. 548,403, filed of even date herewith, for "packless valves", I have disclosed valve-operating mechanism including cooperating rotatable crank-like members, and a non-rotatable flexible wall forming a fluid-tight connection or partition between said crank-like members and a valve housing. In the construction illustrated in said application, the flexible wall has an end member which is engaged by the operating crank-like member and which engages the operated crank-like member, and which gyrates to follow the orbital path of the point of cooperation of said crank-like members. As said end member, though gyrating, is non-rotatable, however, the operating and the operated crank-like members must both rotate about their own axes with respect to said end member. This is permitted in the construction illustrated in said application by the spherical surfaces of engagement between both of said crank-like members and the said end member. Notwithstanding these spherical surfaces of engagement, however, the friction between said crank-like members and said end member tends to cause said end member to rotate with said crank-like members, and this friction between said engaging surfaces may become relatively large particularly where the opposition to movement of the valve member may be relatively great, as for example is the case in a gate valve wherein the valve member is designed to be forced into intimate engagement with its seat so that a relatively large force has to be applied in order to effect movement of said valve member with respect to its seat. Where the opposition to movement, and therefore the force to effect movement, is relatively large, the frictional grip between the cooperating surfaces at the place where the cooperating crank-like members and the end member of the flexible wall are in engagement may be such as to produce a torque on the flexible wall that is likely to over-stress and cause the early failure of the same.

It is an object of this invention to provide operating mechanism including a rotatable crank-like member and means for rotating the same, and a flexible wall operatively connected with said operating mechanism, together with means to prevent the rotation of said operating mechanism from exerting a torque on said flexible wall.

Another object of this invention is to provide a valve, particularly a gate valve, having operating means including a rotatable crank-like member and means for rotating the same, with a flexible fluid-tight connection or partition between said operating means and the valve housing, and means to prevent the rotation of said operating means from exerting a torque on said flexible wall.

Another object of this invention is to provide valve-operating means, particularly adapted for use with gate valves of the type wherein the valve member is forced into and out of engagement with its seat by cooperating threaded members, which is simple and rugged and, at the same time, enables the use of a flexible fluid-tight wall between the operating mechanism and valve housing without danger of early failure of said wall through development of excessive stresses thereon.

Other objects will appear as the description of the invention proceeds.

Stated generally, the invention comprises a rotatable crank-like member for operating any suitable device, as a valve member, means for rotating said crank-like member, a flexible wall flexed by the rotation of said parts and preferably having an end member gyrating with said crank-like member, and means to prevent the rotation of said parts exerting a torque on said flexible wall, said means preferably taking the form of gearing actuated by the rotation of said crank-like member and tending to rotate said end member equally and oppositely to the rotation of said crank-like member about its own axis.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same characters of reference are employed to designate corresponding parts in the several figures:—

Fig. 1 is a vertical axial section of a gate valve embodying the present invention;

Fig. 2 is a transverse section on the line 2—2 of Fig. 1;

Fig. 3 is a perspective view, on an enlarged scale, of the end portion of the end member of the flexible wall;

Figure 4:
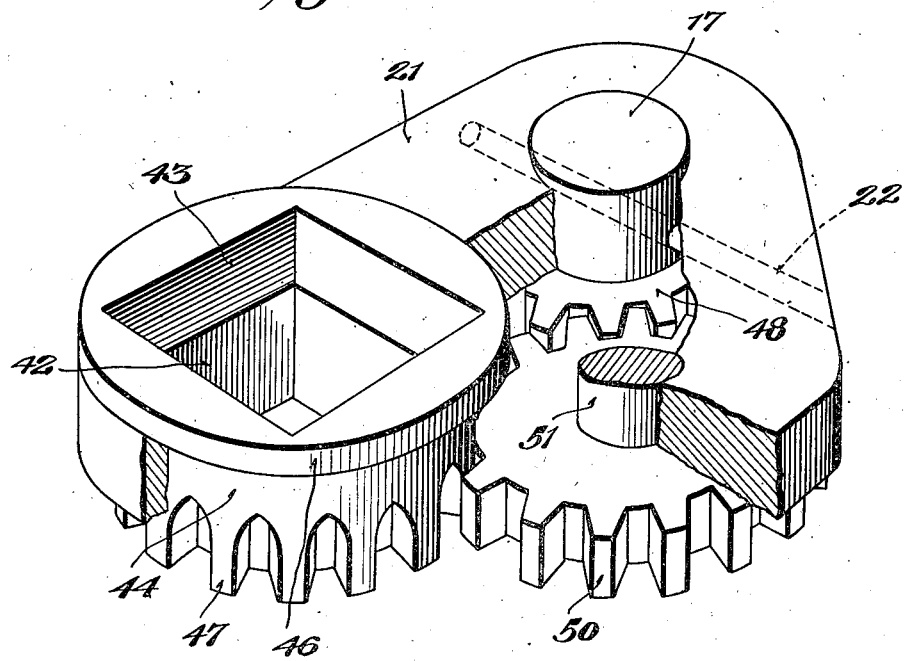
Fig. 4 is an enlarged perspective, partly broken away, to show the gearing somewhat more in detail.

In the form shown in Figs. 1 and 2, the valve housing 10, of any suitable character, is provided with any appropriate inlet and outlet connections 11, and has interiorly thereof a valve seat of any suitable construction, shown as composed of opposed relatively-inclined seats 12, which may be formed together with the ports as a part of the interior partitions 13, or which, as illustrated, may be formed as threaded annular members 14 received in threaded apertures in said partitions 13 with the openings therethrough constituting the valve ports. Cooperating with said valve seat is a valve member 15 of any suitable construction, preferably of wedge-shaped formation, with its opposite sides inclined in conformity with the inclination of the valve seats 12 so that said valve member may be wedged into intimate engagement with said valve seats.

Cooperating with said valve member 15 are means for moving said member out of and into engagement with its seat and, in order to exert the requisite power to force the valve member into wedging engagement with its seat and to release the same therefrom, said valve operating means preferably comprises cooperating threaded members. Said threaded members may be of any suitable construction, but are shown as composed of an interiorly threaded nut 16, integrally formed with or non-rotatably retained on the valve member 15, cooperating with an exteriorly threaded stem 17 rotatably mounted in the brace or partition 18. To prevent transmission of the rotation of the threaded stem 17 to the valve member 15, the latter is preferably provided with a groove or slot 19 on one or both of its end faces to receive a key-like rib or projection 20 which may be formed integrally with or suitably connected to the wall of the valve housing 10. The ribs 20 by their cooperation with the grooves 19 also operate to guide the valve member 15 in its movements into and out of engagement with its seat.

To rotate the threaded stem 17 the end of said stem projecting through the brace 18 is constructed in any suitable way to constitute a crank-like member, being shown as provided with a crank arm or lateral extension 21 suitably secured to the projecting end of the stem 17, as by a pin 22. Axial displacement of the stem 17 is prevented by a collar 23 on said stem engaging the lower side of the brace 18 and the crank arm 21, together with the parts carried thereby and cooperating therewith, engaging the upper side of said brace.

Rotation of the crank-like extension 21 is effected by operating means of any suitable construction, said means being shown as comprising a rotatable crank-like member 24 having a portion 25 in axial alignment with the threaded stem 17 and a laterally deflected or displaced portion 26 the free end 27 of which describes a circular orbit around the coincident axes of the stem 17 and the portion 25 of said crank-like member 24. Said member 24 may be mounted for rotation in any suitable way, being shown as journalled in a sleeve-like extension 28 on the cap 29 which is threaded onto the bonnet 30 of the valve housing. The crank-like member 24 is also provided with a collar 31 for engagement with the inner end of said sleeve 28 to prevent axial outward movement of said crank-like member and, if desired, a second collar 32 may be suitably secured to the outwardly extending end of said crank-like member for coaction with the outer face of the cap 29 to prevent axial inward movement of said crank-like member 24—although the latter is unnecessary, as the resiliency of the flexible partition wall to be described will normally maintain the collar 31 in engagement with the end of the sleeve 28. The outer end of the crank-like member 24 is provided with an operating or hand grasp member 33 of any suitable construction and secured thereto in any suitable way.

Interposed between the crank-like member 24 and the wall of the valve housing is a flexible member affording a fluid-tight connection or partition between said member and said housing. While said flexible member may be of any suitable construction, it is preferably formed as a corrugated, expansible and contractible tubular wall 34, preferably made of any suitable resilient metal, having a flange 35 by which it may be clamped, to constitute a fluid-tight connection, between the cap 29 and the end of the bonnet 30, and a flange 36 by which it may be clamped, to constitute a fluid-tight connection, between flanges on an end wall or member 37 and an exterior sleeve 38 threaded onto said end wall or member 37.

In the form shown, said end wall or member 37 is of generally conical formation preferably, though not necessarily, of substantially the same length as the laterally deflected end 26 of the crank-like member 24, and closed at its free end, where it is preferably given the exterior form illustrated in Fig. 3. As here shown, the end 39 of the member 37 is rectangular in cross section and truncated in opposite directions in longitudinal section, the lateral surfaces 40 being generally cylindrical. The interior surface 41 at the free end of said member 37 is made spherical for cooperation with the spherical end 27 of the crank-like member.

The curved rectangular end 39, 40 of the end member 37 engages in a rectangular aperture 42, flared at its outer end as shown at 43, in a collar-like element 44 rotatably received in an aperture 45 in the crank arm or lateral extension 21 on the threaded stem 17. At its upper end said element 44 is shown as provided with a lateral flange 46 which engages the outer surface of the crank arm or extension 21, while the opposite end of said element which projects through to the opposite side of the crank arm or extension 21 is provided with gear teeth 47. Mounted co-axially with the stem 17 and fixed against rotation is a second gear 48 of the same size as the gear provided by the teeth 47, said gear 48 being shown as interposed between the crank arm or extension 21 and the brace 18 and held against rotation by a pin 49 extending through the gear 48 into said brace or partition 18. The gears 47 and 48 are not in mesh but an idler gear 50 is mounted by means of the pin 51 on said crank arm or extension 21 and is in mesh with both of said gears 47 and 48. The gears 47, 50, 48, therefore constitute a set of planetary gearing co-axial with the axis of the crank-like member 17, 21 and are operated by the rotation of said crank-like member to cause the gear 47 to rotate equally and oppositely to the rotation of the crank arm or extension 21 as the latter rotates about its own axis. Thus, assuming that the crank arm 21 is rotating in a clockwise direction, the idler gear 50, as it is carried around the stationary gear 48 by the rotation of said crank arm, is caused to rotate in a clockwise direction, and the gear 47 in mesh with the gear 50 is therefore caused to rotate in an anti-clockwise direction; since the gears 47 and 48 are of equal size, the extent of angular movement of the gear 47 around its own axis with respect to the crank arm 21 is therefore exactly equal to the extent of the angular movement of the crank arm 21 around its axis; accordingly the sleeve-like element 44 rotates equally and oppositely to the rotation of the crank arm 21 and the rectangular aperture 42 in said element is thereby maintained in a constant and invariable angular relation to any point exterior of said element as, for instance, a point on the valve housing. As the end member 37, owing to the cooperation of its rectangular end 39, 40 with the rectangular aperture 42 in the element 44, is maintained in a contant and invariable relation to the element 44, it follows that said end member 37 is positively maintained in a contant and invariable angular relation to the valve housing as it gyrates around the axis of the valve operating train. There is accordingly no tendency for the end member 37 to rotate around its own axis and therefore no tendency for said end member to exert a torque on the flexible wall 34.

In operation, the valve member 15 is opened and closed by the rotation of the crank-like member 24 in the journal afforded by the sleeve 28 on the cap 29. During rotation of said member 24 its portion 25 rotates about an axis coincident with the axis of the threaded stem 17, but the laterally deflected or displaced end 26 of said member 24 revolves about said axis and the free end 27 of said portion 26 describes a circular orbit about said axes as a center. During this revolution of the laterally deflected or displaced end 26 of the crank-like member 24 the end wall or member 37 of the flexible wall 34 is caused to gyrate with the orbital movement of the end of the laterally deflected or displaced portion 26. This orbital movement is transmitted to the element 44 mounted in the crank-arm or extension 21 and, therefore, said crank arm or extension is caused to rotate around the axis of the stem 17. The gyratory movement of the end member 37 causes the flexible tubular wall 34 to be continually flexed in a lateral direction, which flexure manifests itself as a contraction of the corrugations on the side toward which the portion 26 of the crank-like member 24 is directed at any instant and an expansion of the corrugations on the diametrically opposite side of said wall, the plane of the end of the tubular corrugated wall always lying at an angle to the axis of said wall and describing the zone of a sphere as it flexes progressively under the gyratory movement of the end wall 37. As the crank arm or extension 21 rotates around the axis of the stem 17 it carries the element 44 therewith and, owing to the equal and opposite rotation of said element 44 arising from the travel of gears 47 and 50 around and in mesh with the stationary gear 48, said element 44 is rotated equally and oppositely to the rotation of said crank arm about its own axis, and thereby tends to rotate the end member 37 equally and oppositely owing to the rectangular surfaces of engagement between the element 44 and the end of said member 37, whereby the flexible wall 34 extending as a flexible partition or connection between said end member 37 and the wall of the valve housing, is subjected to no torque. Rotation of the stem 17, owing to the coaction of the threads on said stem with the threads in the nut 16 on the valve member 15, causes said member to move outwardly or inwardly with respect to its valve seat, depending upon the direction of rotation of said stem 17. During this movement of the valve member 15 it is guided and its rotation prevented by the engagement of the key-like ribs 20 on the valve housing with the grooves or slots 19 in the sides of said valve member.

Figure 5:
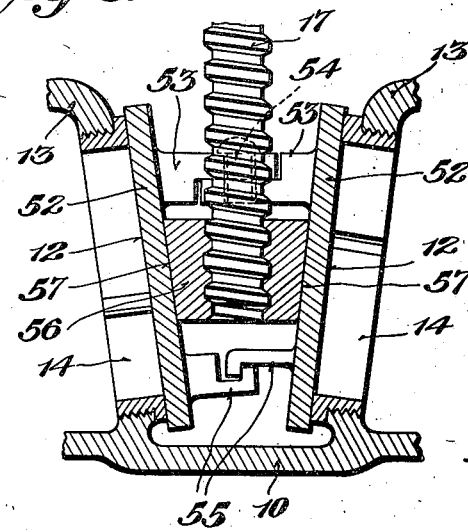
Fig. 5 is a fragmentary axial section illustrating an embodiment of the present invention in which the valve member includes relatively movable valve disks.

In place of a valve member composed of a single wedge-like element as shown in Fig. 1, said valve member may be composed of separable disks 52, as shown in Fig. 5, said valve disks being of any suitable construction and connected into a unit in any suitable way. The valve member illustrated is similar to that disclosed in my prior application Sr. No. 523,410, filed December 19, 1921, the disks 52 being provided with inwardly directed overlapping lugs 53, held in cooperative relation by loosely fitting pins 54, and inwardly directed interengaging hook-like lugs 55 to retain the disks in approximately operative relation. In this construction the nut 56 has limited axial movement with respect to the valve disks 52 and its opposite sides 57 are inclined to wedge said disks into intimate engagement with the opposed valve seats 12. Rotation of the nut 56 with respect to the valve member is prevented in any suitable way, as by the engagement of key-like ribs 20 on the valve housing in slots or grooves 19 in the lateral faces of the nut. Withdrawal of the valve member from its valve seat is effected by the engagement of the nut 56 with the cooperating lugs 53.

The operation of a gate valve with the valve member constructed as shown in Fig. 5 is the same as that heretofore described except that during the initial rotation of the stem 17 to open the valve, the nut 56 moves outwardly with respect to the valve disks 52, relieving said disks from engagement with their seats, until said nut engages the lugs 53, whereupon said valve member is moved out of alignment with its seat as a unit. Conversely, when the stem 17 is rotated to bring the valve member into engagement with its seat, continued rotation of said stem causes the nut 56 to move inwardly with respect to the valve disks 52, wedging said disks into intimate engagement with their seats and compensating for any lack of alignment between said valve disks and seats.

It will therefore be perceived that operating mechanism including a flexible wall has been provided with means to prevent the rotation of said operating mechanism from exerting a torque on said flexible wall, which operating mechanism is especially suitable for operation of valve members and possesses marked utility when employed as the operating mechanism for gate valves where considerable frictional opposition to movement of the valve member is developed and considerable force on the valve operating train is necessary to move the same as a result of forcing the valve member into intimate engagement with its seat. It will be observed that whatever the resistance to movement of the rotatable crank-like member 17, 21, and whatever the force exerted on the rotatable operating member 24, no torque can be exerted on the flexible wall 34 because any and all movements of the crank arm 21 around its own axis is equally and oppositely compensated, owing to the interposed planetary gearing, by the equal and opposite rotation of the element 44 around its own axis, so that the end member 37 is always positively maintained in a constant and invariable angular relation to the valve housing and, therefore, with the flexible member or wall 34 interposed between said end member 37 and the valve housing.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art while certain features thereof are capable of use without other features thereof and changes may be made in the details of construction, proportion and arrangement of parts without departing from the spirit of this invention. While the invention has been illustrated as applied to gate valves and has particular utility when used in conjunction therewith, it is capable of application to other valves and to operating trains of other devices, and reference is therefore to be had to the claims hereto appended for a definition of the limits of the invention.

What is claimed is:—

1. The combination of a valve housing having a valve member therein, means for operating said valve member including a rotatable crank-like member and an operating member for rotating said crank-like member, a flexible wall interposed between said operating means and said valve housing and having an end member interposed between said operating member and said crank-like member, and positive means for preventing the rotation of said operating member from exerting a torque on said end member.

2. The combination of a valve housing having a valve member therein, means including cooperating crank-like members for moving said valve member, a flexible corrugated wall forming a fluid-tight partition between said crank-like members and said valve housing and flexed by the rotation of said members, and means positively preventing the rotation of said crank-like members from exerting a torque on said flexible wall.

3. The combination of a valve housing having a valve member therein, means for operating said valve member including a rotatable crank-like member and means for rotating the same, a flexible wall having an end member gyrating with the rotation of said crank-like member, and means cooperating with said end member to positively prevent the rotation of said operating means from exerting a torque on said end member.

4. The combination of a valve housing having a valve member therein, means for operating said valve member including a rotatable crank-like member and means for rotating the same, a flexible wall having an end member cooperating with and gyrated by the revolution of said crank-like member, and gearing cooperating with said end member to prevent rotation of the same.

5. The combination of a valve housing having a valve member therein, means for operating said valve member including a rotatable crank-like member, a non-rotatable gyrating member movable with said crank-like member, a flexible wall interposed between said gyrating member and said valve housing, and positive means to prevent the rotation of said operating means from exerting a torque on said gyrating member.

6. The combination of a valve housing having a valve member therein, means for operating said valve member including a rotatable crank-like member, a non-rotatable gyrating member movable with said crank-like member, a flexible wall interposed between said gyrating member and said valve housing, and means operated by the rotation of said crank-like member for positively maintaining an invariable angular relation between said gyrating member and the wall of said valve housing.

7. The combination of a valve housing having a valve member therein, means for operating said valve member including a rotatable crank-like member, a non-rotatable gyrating member movable with said crank-like member, a flexible wall interposed between said gyrating member and said valve housing, and means operated by the rotation of said crank-like member and tending to rotate said gyrating member equally and oppositely to the rotation of said crank-like member.

8. The combination of a valve housing having a valve member therein, means for operating said valve member including a rotatable crank-like member, a non-rotatable gyrating member movable with said crank-like member, a flexible wall interposed between said gyrating member and said valve housing, an element on said crank-like member through which said gyrating member cooperates with said crank-like member, and positive means to prevent the movement of said element with said crank-like member from tending to rotate said gyrating member.

9. The combination of a valve housing having a valve member therein, means for operating said valve member including a rotatable crank-like member, a non-rotatable gyrating member movable with said crank-like member, a flexible wall interposed between said gyrating member and said valve housing, an element on said crank-like member through which said gyrating member cooperates with said crank-like member, and means operated by the rotation of said crank-like member and tending to rotate said element equally and oppositely to the rotation of said crank-like member.

10. The combination of a valve housing having a valve member therein, means for operating said valve member including a rotatable crank-like member, a non-rotatable gyrating member movable with said crank-like member, a flexible wall interposed between said gyrating member and said valve housing, an element on said crank-like member through which said gyrating member cooperates with said crank-like member, and planetary gearing coaxial with said crank-like member and cooperating with said element to prevent rotation of said gyrating member.

11. The combination of a valve housing having a valve member therein, means for operating said valve member including a rotatable crank-like member, a non-rotatable gyrating member movable with said crank-like member, a flexible wall interposed between said gyrating member and said valve housing, an element on said crank-like member through which said gyrating member cooperates with said crank-like member, a fixed gear coaxial with said crank-like member, a rotatable gear of equal size coaxial with and connected to said element, and an idler gear on said crank-like member in mesh with both of said gears and tending to rotate said element equally and oppositely to the rotation of said crank-like member.

12. The combination of a valve housing having a valve member therein, means for operating said valve member including a rotatable crank-like member, a non-rotatable gyrating member movable with said crank-like member, a flexible wall interposed between said gyrating member and said valve housing, an element on said crank-like member through which said gyrating member co-operates with said crank-like member, and means for rotating said element relatively to said crank-like member equally and oppositely to the rotation of said crank-like member around its own axis.

13. In combination, a rotatable crank-like member, means for rotating said crank-like member, an element on said crank-like member through which said means rotates said member, a flexible wall having an end member gyrating with said element, and means to positively prevent rotation of said crank-like member from exerting a torque on said flexible wall comprising means for maintaining an invariable relation between said element and said flexible wall.

14. In combination, a rotatable crank-like member, means for rotating said crank-like member, an element on said crank-like member through which said means rotates said member, a flexible wall having an end member gyrating with said element, and means to prevent rotation of said crank-like member from exerting a torque on said flexible wall comprising means for rotating said element relatively to said crank-like member equally and oppositely to the rotation of said crank-like member around its own axis.

15. In combination, a rotatable crank-like member, means for rotating said crank-like member, an element on said crank-like member through which said means rotates said member, a flexible wall having an end member gyrating with said element, and means to prevent rotation of said crank-like member from exerting a torque on said flexible wall comprising planetary gearing coaxial with said crank-like member and cooperating with said element to prevent rotation of said end member.

16. In combination, a rotatable crank-like member, means for rotating said crank-like member, an element on said crank-like member through which said means rotates said member, a flexible wall having an end member gyrating with said element, and means to prevent rotation of said crank-like member from exerting a torque on said flexible wall comprising a fixed gear coaxial with said crank-like member, a rotatable gear of equal size coaxial with and connected to said element, and an idler gear on said crank-like member meshing with both of said gears.

17. In combination, a rotatable crank-like member, means for rotating said member, a flexible wall having an end member gyrating with said crank-like member, and means positively preventing rotation of said crank-like member from exerting a torque on said end member.

18. In a gate valve, the combination of a valve housing having a valve seat therein, a valve member movable rectilineally and transversely of the axis of said seat, means for operating said valve member including a rotatable crank-like member and means for rotating said crank-like member, a flexible wall forming a fluid-tight connection between said valve operating means and said housing, and means to positively prevent the rotation of said valve operating means from exerting a torque on said flexible wall.

19. In a gate valve, the combination of a valve housing having a valve seat therein, a valve member movable rectilineally and transversely of the axis of said seat, means for operating said valve member including a rotatable crank-like member and means for rotating said crank-like member, an element on said crank-like member through which said rotating means operates said crank-like member, a flexible wall forming a fluid-tight joint with said valve housing and having an end member gyrating with said element, and means operated by the rotation of said crank-like member for rotating said element equally and oppositely to the rotation of said crank-like member around its own axis.

20. In a gate valve, the combination of a valve housing having a valve member therein, means for operating said valve member including cooperating threaded members, a crank for producing relative rotation of said threaded members and means for rotating said crank, a flexible wall forming a fluid-tight joint with said valve housing and having an end member gyrating with said crank, and means operated by the rotation of said crank for positively preventing rotation of said end member.

21. In a gate valve, the combination of a valve housing, a valve member in said housing including opposed valve disks, means for operating said valve member including a wedge for forcing said valve disks into engagement with their seats, cooperating threaded members for moving said wedge and valve disks and crank mechanism for producing relative rotation of said threaded members, a flexible wall forming a fluid-tight partition between said operating means and said valve housing, and positive means to prevent the rotation of said crank mechanism from exerting a torque on said flexible wall.

22. In combination, a rotatable crank-like member, means for rotating said member, a flexible wall having an end member gyrating with said crank-like member, and means operated by the rotation of said crank-like member for positively maintaining an invariable angular relationship between said end member and the axis of said crank-like member.

23. In combination, a rotatable crank-like member, means for rotating said member, a flexible wall having an end member gyrating with said crank-like member, and means operated by the rotation of said crank-like member for rotating said end member relatively to said crank-like member equally and oppositely to the rotation of said crank-like member around its own axis.

24. In combination, a rotatable crank-like member, means for rotating said member, a flexible wall having an end member gyrated by said crank-like member, a second crank-like member operated by the first crank-like member, and means interposed between said end member and said second crank-like member and positively maintaining an invariable angular relationship between said end member and the axis of said first crank-like member.

25. In combination, a rotatable crank-like member, means for rotating the same, a flexible wall having an end member gyrated by said crank-like member, a second crank-like member operated by the rotation of said first crank-like member, and means interposed between said end member and said second crank-like member for rotating said end member relatively to the said first crank-like member equally and in the opposite direction to the rotation of said first crank-like member around its own axis.

26. In combination, a gate valve, a screw-threaded stem secured thereto, an arm extending laterally from said stem, a flexible wall having a rigid end member in operative relation with said arm, a crank-like member within said flexible wall and in operative engagement with the end member thereof, whereby said flexible wall is gyrated when said crank-like member is operated, and means interposed between said end member and said arm to maintain an invariable angular relationship between said end member and the axis of said crank-like member.

27. In combination, a gate valve, a screw-threaded stem secured thereto, an arm extending laterally from said stem, a flexible wall having a rigid end member in operative relation with said arm, a crank-like member within said flexible wall and in operative engagement with the end member thereof, whereby said flexible wall is gyrated when said crank-like member is operated, and means interposed between said end member and said arm for rotating said end member relatively to said crank-like member equally and in a direction opposite to the direction of rotation of said crank-like member around its own axis.

In testimony whereof I have signed this specification.

WESTON M. FULTON.